Patented Apr. 22, 1941

2,238,896

UNITED STATES PATENT OFFICE 2,238,896

PROCESS FOR HALIDE PREPARATION

Mortimer M. Gibbons, Rahway, N. J.

No Drawing. Application March 10, 1939,
Serial No. 260,897

7 Claims. (Cl. 210—28)

This invention relates to processes for reacting halogen and water in the presence of carbonaceous materials.

My invention may be applied wherever it is desired to convert a halogen in the presence of water into the corresponding halide ion. For example, it may be used in the manufacture of potable and industrial waters where chlorine is used for sterilization. An excess of chlorine is desirable for sterilization, but unless removed causes an unpleasant chlorine taste and odor.

Consequently, various methods have been suggested for the removal of the excess chlorine such as treatment with sulfur dioxide, sodium thiosulfate and activated carbon. The use of chemicals to remove the excess chlorine requires the use of special equipment and careful supervision. In addition, the chemicals in themselves impart taste and odor to the water. It has also been suggested that the chemicals may aid the after-growth of organisms in the water after treatment. Activated carbon is effective for the removal of chlorine from water; however, it is expensive and is costly to use on a large scale such as is required in municipal and industrial water systems. Some activated carbons are not suitable for use because of physical characteristics. Furthermore, marked corrosive effects are often observed when activated carbon is used in metal tanks so that especially designed equipment must be used to contain it. Other carbonaceous materials such as anthracite coal, bituminous coal, cannel coal, and lignite coal, coke and wood charcoal, possess slight dechlorinating properties, but the speed of reaction is so slow as to render their use highly impractical.

My invention may also be used for the manufacture of hydrohalogen acids. It has been proposed to manufacture hydrohalogen acids such as hydrochloric acid by reacting water vapor or steam and chlorine in the presence of carbon at elevated temperatures. These processes are subject to operating difficulties and have not attained much prominence. The use of activated carbons for this purpose has also been suggested.

It is an object of this invention to provide a process whereby halogen and water may be reacted together. It is a further object of this invention to provide a process for simply and economically manufacturing hydrohalogen acids, or for concentrating or purifying such acids, or for manufacturing salts of hydrohalogen acids.

It is another object of this invention to provide a process for simply and economically dechlorinating chlorine bearing waters.

I have found that when a halogen and water are brought into contact with a carbonaceous material, such as anthracite coal, bituminous coal, cannel coal, and lignite coal, which previously has been prepared by heating to 70° C. to 200° C. with an acidic material, such as fuming sulfuric acid, concentrated sulfuric acid, chlorosulfonic acid, and sulfur trioxide, and washing, the corresponding halide ion is produced. Thus, if pure water is used, the corresponding hydrohalogen acid is formed, whereas if a base is present, the corresponding halide salt of the base is formed.

These carbonaceous materials have physical properties which permit them to be used in the form of a bed through which the halogen bearing water may be passed or they may be brought into contact with the halogen and water in other suitable ways. They do not cause corrosion of metals and may be used in tanks constructed of metals such as steel. They do not impart taste or odor to the treated water, but on the contrary aid in removing taste, odor and bacteria.

Specific embodiments of my invention are set forth in the following examples, but it is to be understood that the examples are presented by way of illustration and not of limitation, and that I am to be limited only by the appended claims.

Example I

A solution of halogen in water was passed through a bed 24 inches in thickness of treated anthracite coal. The rate of flow was two gallons per square foot per minute. The effective particle size was 0.7 millimeter. Typical data on runs of the halogens indicated are given in the table:

| Halogen | Chlorine | Bromine | Iodine |
|---|---|---|---|
| Concentration of halogen in applied water in ppm | 4 | 176 | 126 |
| Concentration of halogen in effluent water in ppm | 0.04 | 30 | 23 |
| Concentration of halide ion in applied water in ppm | .7 | 22 | 25 |
| Concentration of halide ion in effluent water in ppm | 11 | 167 | 87 |

Treated bituminous coal, treated cannel coal, and treated lignite coal may be substituted for the treated anthracite coal with equally satisfactory results.

Example II

A solution of sodium hypochlorite containing 24 ppm. available chlorine was passed through a bed of treated anthracite coal twenty four inches thick at a rate of 2 gallons per square foot per minute. The effluent water contained 0.06 ppm. free chlorine. The influent water contained 8 ppm. combined chlorine; the effluent water contained 35 ppm. combined chlorine.

*Example III*

A solution of hydrochloric acid (1:10) containing 146 ppm. free chlorine was passed through a bed of treated anthracite coal twenty-four inches thick at a rate of 2 gallons per square foot per minute. The effluent water contained 5 ppm. free chlorine.

It will be apparent at once to one skilled in the art that many variations in amounts and proportions of reagents, in temperatures, in mechanical arrangements, and in operating and other conditions may be practiced in the application of the fundamental principles of my invention, and that the characteristics of the product obtained, and economies of production may consequently vary over a wide range. All such variations and modifications are comprised within the scope of the invention as defined in the claims.

I claim:

1. The process which comprises reacting a halogen of the group consisting of chlorine, bromine and iodine and water in the presence of a treated carbonaceous material formed by reacting a carbonaceous material selected from the group consisting of anthracite coal, bituminous coal, cannel coal, and lignite coal with an acid material selected from the group consisting of concentrated sulfuric acid, fuming sulfuric acid, chloro-sulfonic acid and sulfur trioxide.

2. The process which comprises reacting chlorine and water in the presence of a treated carbonaceous material formed by reacting a carbonaceous material selected from the group consisting of anthracite coal, bituminous coal, cannel coal, and lignite coal, with an acidic material selected from the group consisting of concentrated sulfuric acid, fuming sulfuric acid, chlorosulfonic acid and sulfur trioxide.

3. The process which comprises reacting chlorine and water in the presence of treated anthracite coal formed by reacting anthracite coal with an acidic material selected from the group consisting of concentrated sulfuric acid, fuming sulfuric acid, chloro-sulfonic acid, and sulfur trioxide.

4. The process which comprises reacting chlorine and water in the presence of treated bituminous coal formed by reacting bituminous coal with an acidic material selected from the group consisting of concentrated sulfuric acid, fuming sulfuric acid, chloro-sulfonic acid and sulfur trioxide.

5. The process which comprises reacting chlorine and water in the presence of treated lignite coal formed by reacting lignite coal with an acidic material selected from the group consisting of concentrated sulfuric acid, fuming sulfuric acid, chlorosulfonic acid and sulfur trioxide.

6. The process which comprises reacting a halogen of the group consisting of chlorine, bromine, and iodine, and acidic water in the presence of a treated carbonaceous material formed by reacting a carbonaceous material selected from the group consisting of anthracite coal, bituminous coal, cannel coal, and lignite coal with an acid material selected from the group consisting of concentrated sulfuric acid, fuming sulfuric acid, chlorosulfonic acid, and sulfur trioxide.

7. The process which comprises reacting a halogen of the group consisting of chlorine, bromine, and iodine, and alkaline water in the presence of a treated carbonaceous material formed by reacting a carbonaceous material selected from the group consisting of anthracite coal, bituminous coal, cannel coal, and lignite coal with an acid material selected from the group consisting of concentrated sulfuric acid, fuming sulfuric acid, chlorosulfonic acid, and sulfur trioxide.

MORTIMER M. GIBBONS.